Patented July 23, 1946

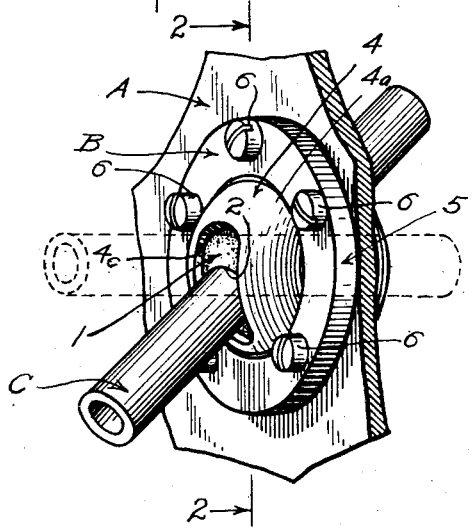
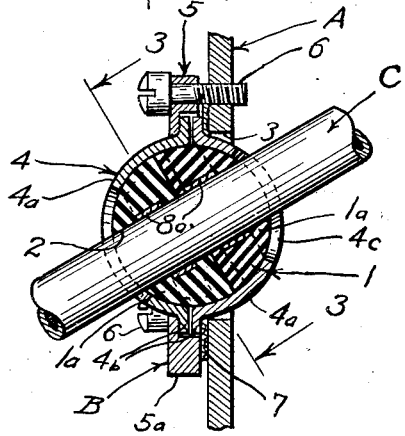
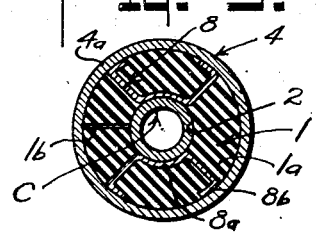
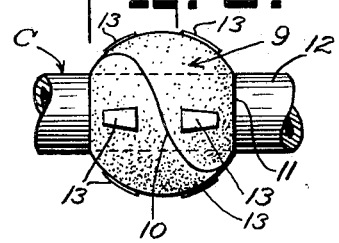
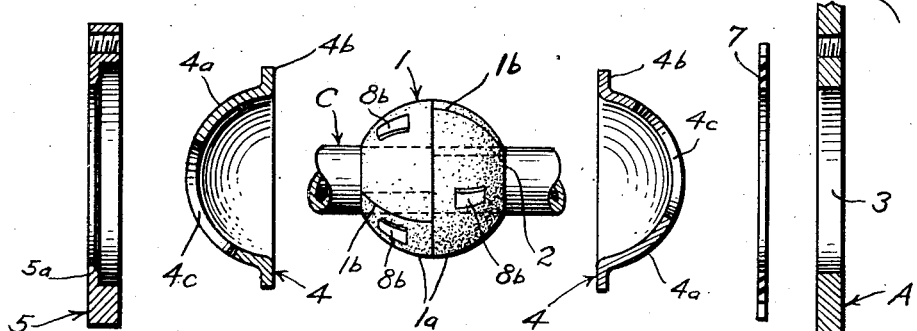
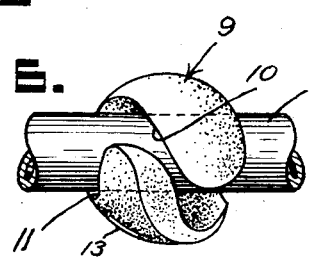

UNITED STATES PATENT OFFICE 2,404,539

ADJUSTABLE CONDUIT SUPPORT FOR BULKHEADS

Benjamin F. Schmidt, Los Angeles, Calif., assignor to Adel Precision Products Corp., a corporation of California Application March 24, 1943, Serial No. 480,401

8 Claims. (Cl. 285—30)

An object of this invention is to provide an improved grommet-like support for a conduit line where it passes through a bulkhead, particularly in aircraft, the support being constructed and arranged so that after it is mounted on the bulkhead, it may be readily adjusted to extend the conduit in a straight line at various angles, with a minimum length of conduit between desired points and without requiring the use of angularly jointed conduits or the bending of the conduit, thereby effecting an appreciable saving in material, time and labor and making possible an easier installation of conduit lines in the best possible manner for the particular aircraft construction.

Another object of my invention is to provide a conduit support of the character described embodying a construction and arrangement of parts whereby a universal adjustment of the conduit supported thereby is made possible while the support is mounted on the bulkhead in order that the conduit may be extended through the bulkhead at any desired angle to best suit the particular aircraft construction and the desired conduit installation with a minimum amount of conduit and a minimum of installation accessories.

A further object of my invention is to provide a conduit support of the character described which includes a grommet made of yieldable cushioning material and adjustably mounted and retained in a bulkhead opening to afford a vibration-absorbing and wear-preventing seat for the conduit which passes through an aperture formed in the grommet in such contact therewith as to form a fluidtight seal.

Another object of my invention is to provide a cushioned and adjustable conduit support such as described wherein an electrically conductive strip is carried by the yieldable conduit supporting grommet so as to contact the conduit and metallic grommet supporting elements attached to the bulkhead to ground or bond the conduit to the bulkhead in all adjusted positions of the grommet, thereby preventing accumulation of static electricity in the conduit line.

A further object of my invention is to provide a conduit support such as described in which the yieldable and adjustable conduit supporting grommet is clamped on and held under substantially uniform compression around the conduit by the means for securing the support to a bulkhead, thereby securely holding the support and conduit in the desired position.

Yet another object is to provide a conduit support such as described which may be easily installed on the bulkhead from one side thereof and which seals the opening provided in the bulkhead for the extension of the conduit therethrough.

Another object is to provide in an adjustable support such as described a grommet which is formed in a particular manner so that it may be more conveniently mounted on the conduit.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Fig. 1 is a fragmentary perspective view of an adjustable conduit support embodying my invention and as when installed on a bulkhead;

Fig. 2 is a sectional view taken on the line 2—2 of Fig. 2;

Fig. 3 is a sectional view taken on the line 3—3 of Fig. 2;

Fig. 4 is an exploded view of the conduit support;

Fig. 5 is a side elevation of a modified form of grommet as when completely installed on the conduit;

Fig. 6 is a side elevation of the grommet of Fig. 5 as when partly installed on the conduit.

Referring to the drawing more specifically, A designates a bulkhead, for example, as found in aircraft, B an adjustable conduit supporting device embodying the present invention mounted on the bulkhead, and C the conduit extending through the bulkhead and supported by the device B.

In accordance with my invention the device B includes a grommet 1 having a central conduit receiving aperture 2 through which the conduit extends, and a means for adjustably supporting the grommet in the opening 3 in the bulkhead A, so that while the conduit is held in the grommet the latter may be adjusted to extend the conduit at various angles through the bulkhead in a straight line with the least amount of line between desired points, the grommet being preferably made of yieldable cushioning material such as rubber or synthetic rubber to provide a vibration-absorbing seat as well as fluid-tight seal around the conduit.

As here provided the grommet 1 is spherical and adjustably supported in a sectional, shell-like, spherical metallic holder 4, the sections 4a of which are semi-spherical and provided with outwardly extending opposed marginal flanges 4b. This sectional spherical holder encompasses and fits snugly around the grommet and has a slot 4c in each section in registration with the conduit receiving aperture 2 whereby the conduit may be extended through the holder and is adjustable in said slots when the grommet is adjusted relative to the holder. The width of these slots is such that the conduit may be freely extended therethrough and adjusted therein without contact with the holder sections.

Means is provided for supporting the holder 4 in the bulkhead opening 3 with the holder and the grommet projecting part way through the opening 3 and the holder adjustable therein. As here shown this holder supporting means includes a metal ring 5 surrounding the holder and adapted to be secured to the bulkhead A by means of screw fastenings 6. The inner periphery of the ring 5 is provided with an inwardly extending flange 5a of less thickness than the ring and which engages the outer section 4a and overlies the outer face of the flange 4b on said outer section. The flange 4b or the inner section of the holder bears against an annular sealing gasket 7 which engages the bulkhead.

With the holder assembled on the bulkhead as shown in Fig. 2, but before the tightening of the fastenings 6, it is apparent that the holder 4 with the grommet therein may be turned or rotated or the grommet turned relative to the holder to change the angle of the conduit. The adjustment of the holder also changes the position and plane of the slots 4c whereby the grommet 1 may be further adjusted relative to the holder to change the angle of the conduit as desired, there being in effect a universal adjustment to make possible a greater range of adjustments of the conduit to extend it at any desired angle through the bulkhead. When the conduit is disposed at the desired position or angle the fastenings 6 are tightened so that the ring 5 will force sections of the holder 4 together and place the grommet under compression thereby yieldably clamping the grommet around the conduit to securely hold it in place and provide a seal around the conduit.

As shown in Figs. 1 to 4 inclusive the spherical grommet 1 is formed of two semi-spherical half sections 1a and each section is slit as at 1b from one side of the aperture 2 out through the curved surface of the section as best shown in Figs. 3 and 4, the slits extending at right angles to the flat faces of said sections. With this arrangement the sections 1a are separately mounted on the conduit through the slits 1b, the slits being opened to allow the conduit to be positioned in the aperture 2 in said sections. The two sections are then brought together to form a sphere as shown in Fig. 4 with the slits 1b out of line to afford a better fluid sealing action around the conduit. It is now seen that the grommet 1 divided and split as here provided may be much more readily and easily assembled on the conduit than a one-piece apertured sphere either before or after the conduit is passed through the opening 3 in the bulkhead.

Each section 1a of the spherical grommet 1 is provided with a pair of electrically conductive bonding strips 8 threaded therein so that an arcuate intermediate portion 8a of each strip is exposed in the aperture 2 for engagement with the conduit while end portions 8b are bent to overlie the curved surfaces of the sections for contacting the metallic holder 4. The portions 8a are disposed to engage opposite sides of the conduit. As the holder is in contact with ring 5 and the latter is electrically connected through the fastenings 6 to the metal bulkhead A, it is seen the conduit will be grounded to said bulkhead to prevent accumulation of static electricity in the conduit line, the contacting portions 8a and 8b being pressed or embedded in the yieldable material of the grommet as shown in Figs. 2 and 3 when the device as a whole is assembled and installed as shown in Figs. 1 and 2.

A modification of the invention as shown in Figs. 5 and 6 relates to the yieldable spherical grommet 9 only, the other parts being the same as shown in Figs. 1 to 4 inclusive. In this modification the grommet 9 is split spirally as at 10 from one side of the conduit-receiving aperture 11 therein to the outer surface thereof. The split 10 is opened by pulling apart portions of the grommet on opposite sides split as indicated in Fig. 6, thereby making it possible to snap the grommet sidewise onto the conduit 12 as shown in Fig. 3 the split being closed when the conduit is received in the aperture 11. The spiral character of the split aids in keeping the grommet in place upon the conduit preparatory to placing the grommet within the holder.

As is the case with grommet 1 in Figs. 3 and 4, the split 10 in the grommet 9 is tightly closed when the grommet is placed under compression by means of the holder and associated elements when the support as a whole is completely installed, but in both embodiments of the invention, before the screws 6 are completely screwed down, the grommet, owing to the spherical shape of the chamber containing it, may be turnably adjusted in all directions as desired. Bonding strips 13 are provided in the grommet 9 in the same manner as shown in Figs. 2 to 4. In both forms of the invention the inner end portions of the bonding strips have a wiping contact with the conduit when the latter is angularly adjusted.

It is important to note that the supporting device may be readily assembled and installed on one side of the bulkhead either before or after the conduit is inserted through the opening 3 therein, and that with the screws 6 set to hold the device assembled and on the bulkhead but not tightened it is possible to readily adjust the grommet 1 relative to the holder 4 to set the conduit at various angles, or to adjust the holder relative to the ring 5 to provide a greater range of angular disposition of the conduit. These are important provisions as they make it unnecessary to employ unions, couplings and other separate connections, or to bend the conduit as heretofore required where the conduits are passed through bulkheads. In consequence less conduit material is required between given points, and the installation of the conduit on the bulkhead may be effected with an appreciable saving in time, labor and costs with the advantage of providing a bonded and cushioned seat and a more effective seal around the conduit.

An important provision of my invention is that the spherical grommet holder has a comparatively small slot area so as to better confine and more uniformly compress the grommet and prevent an objectionable flow of the yieldable grommet material into said slots incident to the clamping action of the holder. The opposed, cooperating slots 4c are therefore dimensioned and arranged to provide for a large range of adjustment of the conduit without making opening in the holder of such extent as would appreciably impair the compressing and confining action thereof relative to grommet. This assures a more effective supporting sealing and cushioning action, and also provides for a universal adjustment of the conduit within limits determined by the lengths of said slots.

Moreover, it is seen that my improved conduit support provides for a reliable fluid-tight sealing of the conduit-receiving opening in the bulkhead and around the conduit in all adjusted positions of the support and the conduit, one reason for this being that the material around the passage 2 which extends diametrically through the grommet closely grips all that part of the conduit contained within said passage. This desirable result would not be so efficiently attained were it not for the fact that the grommet body can be turned in all directions within the spherical holder 4 when the screws 6 are loosened.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In an adjustable conduit support for bulkheads, a grommet through which a conduit extends, and means supporting said grommet in an opening in a bulkhead so that the grommet may be adjusted therein while the conduit extends through said grommet and opening, to position the conduit at various angles, said grommet being formed as a substantially spherical body of yieldable cushioning material, said supporting means including a substantially spherical chamber adapted to contain and to grip said grommet in all positions of a universal adjustment.

2. In an adjustable conduit support for bulkheads, a grommet through which a conduit extends, means containing a spherical chamber supporting said grommet in an opening in a bulkhead so that the grommet may be adjusted therein while the conduit extends through said grommet and opening, to position the conduit at various angles, said grommet being formed of yieldable cushioning material, and an electrically conductive strip carried by said grommet for bonding the conduit to said bulkhead, said conductive strip being so disposed relative to the conduit-engaging and support-engaging surfaces of the grommet as to effect bonding contact between the conduit and the support regardless of the position of the grommet in the support.

3. In an adjustable conduit support for bulkheads, a grommet of yieldable cushioning material having an aperture therein through which a conduit is extended in a sealing fit therewith, a grommet holder for supporting the grommet in an opening in a bulkhead for rotational adjustment relative to the holder to vary the angle of extension of the conduit through the bulkhead, a supporting member adjustably retaining the holder on the bulkhead to permit of further varying the angle of extension of the conduit through the bulkhead, and means for fastening the said supporting member on the bulkhead, said grommet being spherical and said holder being spherical and formed in sections encompassing said grommet, said grommet, with a conduit extending therethrough, being adjustable in a plane extending at a right angle to the plane in which the grommet is rotationally adjustable.

4. In an adjustable conduit support for bulkheads, a grommet of yieldable cushioning material having an aperture therein through which a conduit is extended in a sealing fit therewith, a grommet holder for supporting the grommet in an opening in a bulkhead for adjustment relative to the holder to vary the angle of extension of the conduit through the bulkhead, a supporting member adjustably retaining the holder on the bulkhead to permit of further varying the angle of extension of the conduit through the bulkhead, and means for fastening the said supporting member on the bulkhead, said grommet being spherical and said holder being spherical and formed in sections encompassing said grommet, said holder having opposed, cooperating slots in the sections thereof in which slots the conduit is movable for adjustment when the grommet is adjusted relative to the holder, thereby providing for a universal angular adjustment of the supported conduit within limits determined by the lengths of said slots.

5. In an adjustable conduit support for bulkheads, a grommet of yieldable cushioning material having an aperture therein through which a conduit is extended in a sealing fit therewith, a grommet holder for supporting the grommet in an opening in a bulkhead for adjustment relative to the holder to vary the angle of extension of the conduit through the bulkhead, a supporting member adjustably retaining the holder on the bulkhead to permit of further varying the angle of extension of the conduit through the bulkhead so that universal adjustability thereof results, means for fastening the said supporting member on the bulkhead, said grommet being spherical and said holder being spherical and formed in sections providing a spherical chamber fitting around said grommet, said holder having slots in the sections thereof in which slots the conduit is movable when the grommet is adjusted relative to the holder, and an electrically conductive strip carried by said grommet for bonding the conduit to the bulkhead.

6. In an adjustable conduit support for a bulkhead, a substantially spherical grommet of yieldable material having a conduit-receiving aperture therein and a spirally extended slit extending from the outer surface of the grommet to said aperture so that the conduit may be passed through said slit into said aperture and held therein with parts of the grommet overlapping at opposite sides of said slit, and means supporting said grommet in an opening in the bulkhead, with the grommet under compression.

7. In an adjustable conduit support for bulkheads, a spherical yieldable grommet having a conduit-receiving opening, a sectional substantially spherical holder comprising two hemispherical shells which cooperate to encompass said grommet so that the grommet with the conduit therein is adjustable relative to the holder to dispose the conduit at various angles, opposed flanges on the sections of the holder, a retaining and clamping ring surrounding said holder for adjustably retaining it in a bulkhead opening and for clamping said flanges against the bulkhead, said sections of the holder having opposed, cooperating slots through which the conduit extends and is supported for universal adjustment within the limits of its swing in said slots, and fastening means for securing said ring to the bulkhead.

8. In an adjustable conduit support for bulkheads, a grommet through which a conduit extends, and means supporting said grommet in an opening in a bulkhead so that the grommet may be adjusted therein while the conduit extends through said grommet and opening to position the conduit at various angles, said grommet being formed of yieldable material and having a conduit-receiving aperture extending therethrough and being split in a spiral manner from an outer surface thereof to said aperture so that the conduit may be passed through said slit into said aperture and the spiral character of the slit will aid in keeping the grommet in place upon the conduit.

BENJAMIN F. SCHMIDT.